(12) United States Patent
Nguyen et al.

(10) Patent No.: US 6,216,278 B1
(45) Date of Patent: Apr. 17, 2001

(54) PROTECTIVE HAIR COVERING FOR USE WHEN TANNING

(76) Inventors: Le Nguyen; Hung Bob Vu, both of 203 Perennial Way, Madison, AL (US) 35757

( * ) Notice: Subject to any disclaimer, the term of this patent is extended or adjusted under 35 U.S.C. 154(b) by 0 days.

(21) Appl. No.: 09/440,006

(22) Filed: Nov. 12, 1999

(51) Int. Cl.$^7$ .................................................. A42B 1/04
(52) U.S. Cl. ........................................................ 2/174
(58) Field of Search ........................ 2/174, 181, 171.04, 2/171.2, 200.1

(56) References Cited

U.S. PATENT DOCUMENTS

| | | | |
|---|---|---|---|
| D. 243,800 | * | 3/1977 | Mast ............................ D28/19 |
| 663,670 | * | 12/1900 | Wiswall ............................ 2/174 |
| 1,300,644 | * | 4/1919 | Phillips ............................ 2/174 |
| 2,889,557 | * | 6/1959 | Blair ............................ 2/174 |
| 3,556,115 | * | 1/1971 | Benson ............................ 132/49 |
| 3,746,015 | * | 7/1973 | Schulman ............................ 132/9 |
| 4,061,898 | * | 12/1977 | Murray et al. ............................ 219/211 |
| 4,459,471 | * | 7/1984 | Hulett et al. ............................ 219/527 |
| 4,683,596 | * | 8/1987 | Cole ............................ 2/174 |
| 5,249,308 | * | 10/1993 | Blume ............................ 2/174 |
| 5,265,278 | * | 11/1993 | Watanabe ............................ 2/174 |
| 5,477,561 | | 12/1995 | Adkins . |
| 5,850,636 | * | 12/1998 | Reuven ............................ 2/174 |

* cited by examiner

*Primary Examiner*—John J. Calvert
*Assistant Examiner*—Alissa L. Hoey
(74) *Attorney, Agent, or Firm*—Gwendolyn D. Harris

(57) ABSTRACT

A hair covering for protecting the hair of a wearer from damage due to exposure to the ultra violet light of a tanning bed. The hair covering is comprised of an outer portion, middle portion and inner portion. The middle portion protects the hair of a wearer from discoloration and other damage because of exposure to the ultra violet light of a tanning bed. Furthermore, the middle portion acts as a barrier to the heat build up that can occur within the hair covering because of the heat generated by ultra violet light in a tanning bed. The outer portion and the inner portion act as additional protection for blocking the heat generated by the ultra violet light of a tanning bed. The hair covering may also have a stretchable band for providing a comfortable and snug fit around the head of a wearer.

6 Claims, 1 Drawing Sheet

PROTECTIVE HAIR COVERING FOR USE WHEN TANNING

FIELD OF THE INVENTION

The present invention generally relates to a hair covering to be worn by a tanner during a tanning session and, more particularly, a hair covering which protects the hair of a tanner from discoloration and other damage, such as drying and frizzing, during a tanning session.

BACKGROUND OF THE INVENTION

In order to maintain a darkened skin tone, many persons use a tanning bed at a tanning salon. The ultraviolet (UV) lights used in tanning beds can discolor, dry out, make frizzy, or otherwise damage the hair of a tanner. This, particularly, is undesirable for women who may have paid as much as $75 for hair services, such as permanents, colors or rinses.

Of course, the use of caps and other head and hair coverings for protection is not new. Swimming caps are available to protect a swimmer's hair from damage due to harsh chemicals found in swimming pools. And caps and hats of various styles are available to protect a wearer's face and hair from either extreme hot or cold outdoor weather conditions. Similarly, the use of skin care and tanning products to protect the skin of a tanner from the effect of extended exposure to sunlight is not new.

However, there is no product specifically designed to protect the hair of a tanner from damage and discoloration due to exposure to UV light. In particular, no such product is available for use during a tanning session in a standard tanning bed.

What is needed is an inexpensive, convenient and reusable cap or other hair covering which will protect the hair of a tanner from discoloration or other damage, such as drying and frizzing, during a tanning session.

SUMMARY OF THE INVENTION

Therefore, a principal object of the present invention is provide an inexpensive hair covering that protects the hair of a tanner from discoloration or other damage due to exposure to UV light during a tanning session.

It is a further object of the present invention to provide a hair covering that acts as a barrier to the heat build up that can occur because of the heat generated by the UV light during a tanning session.

It is a further object of the present invention to provide a reusable hair covering for use during a tanning session.

It is a further object of the present invention to provide an aesthetically pleasing hair covering for use during a tanning session.

Therefore, in accordance with the present invention, a hair covering for protecting the hair of a wearer when tanning is described having an outer portion formed from material, the outer portion having a periphery; a middle portion having a protective foil layer, the middle portion disposed within the outer portion and having a periphery attached to the periphery of the outer portion in a gathered fashion; and an inner portion formed from material having a periphery, the inner portion disposed within the middle portion, the periphery of the inner portion being attached to the periphery of the middle portion and the periphery of the outer portion in a gathered fashion.

DETAILED DESCRIPTION OF THE DRAWINGS

Figure 1:
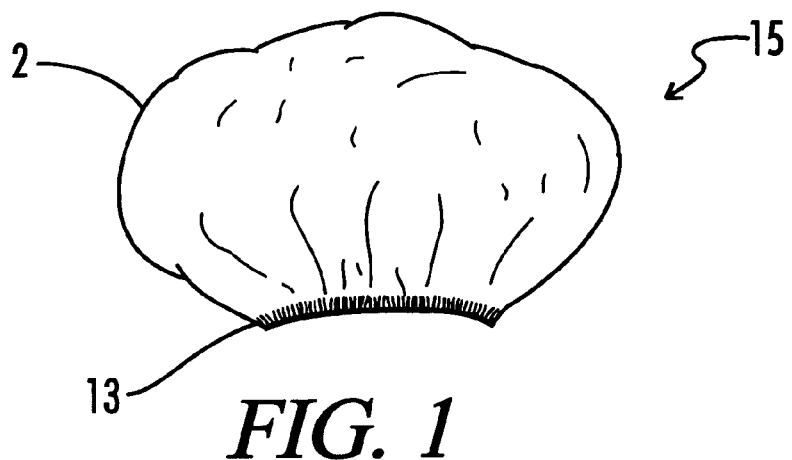
FIG. 1 is a perspective view of the hair covering of the present invention.
Figure 2:
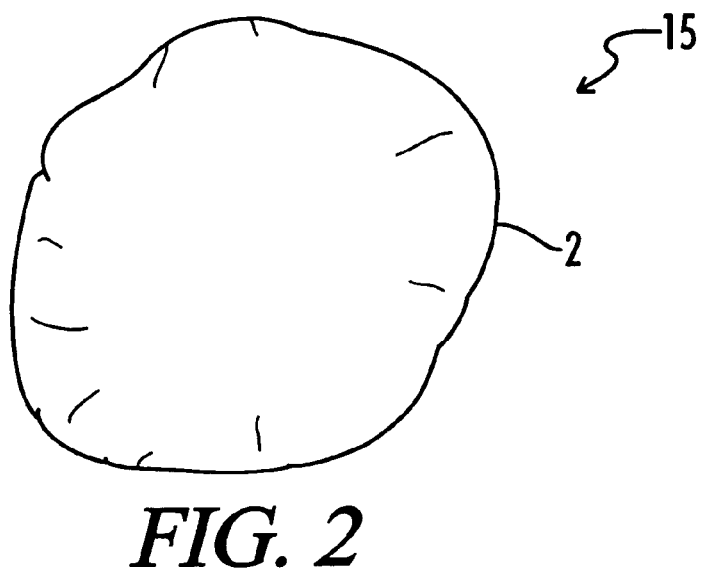
FIG. 2 is a top view of the exterior portion of the hair covering of the present invention.
Figure 3:
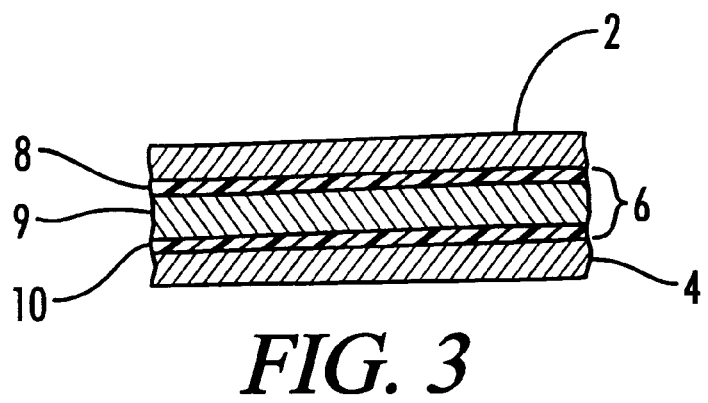
FIG. 3 is a side view of a cross section of a cut away portion of the hair covering of the present invention.

The present invention will be further explained by description of the preferred and alternate embodiments illustrated in FIGS. 1–3. FIG. 1 is a hair covering 15 in accordance with the present invention. Hair covering 15 has a layer of material which forms an outer portion 2 of hair covering 15. Outer portion 2 functions to help block the heat generated from the UV light and as an aesthetically pleasing hair covering for a wearer.

Outer portion 2 has a periphery which is attached to other portions of hair covering 15 (shown in FIG. 3) in a gathered fashion such that hair covering 15 fits comfortably and snugly around the head of a wearer. Preferably, outer portion 2 is made from a light weight and durable fabric such as cotton or a cotton blend.

FIG. 2 is a top view of the outer portion 2 which is made from a circular or other rounded piece of material. Similarly, inner portion 4 and middle portion 6 are also made from circular or rounded pieces of material.

Referring now to FIG. 3, a side view of a cross section of a cut away portion of the hair covering 15 of the present invention is shown. It can be seen that middle portion 6 is disposed within outer portion 2. The middle portion 6 is made of material which protects the hair of a tanner from discoloration or other damage due to exposure to UV light and acts as a barrier to the heat build up that can occur because of the heat generated by the UV light during a tanning session.

Specifically, middle portion 6 may be formed using plastic films 8 and 10 which act as barriers to the heat build up that can occur because of the heat generated by the UV light during a tanning session. In addition, a protective foil layer 9 is disposed between the plastic films 8 and 10. The protective foil layer 9 is made of a material, such as aluminum, which is capable of blocking and preventing the penetration of the UV light through the hair covering 15. This capability of the protective foil layer 9 protects the hair of a tanner from discoloration or other damage because of exposure to the UV light during a tanning session. Preferably, plastic films 8 and 10 and the protective foil layer 9 of middle portion 6 are bonded or otherwise attached to each other to form a single layer.

Further, middle portion 6 has a periphery. The periphery of the middle portion 6 and the periphery of the outer portion 2 are attached in a gathered fashion, preferably by sewing the periphery of the middle portion 6 to the periphery of the outer portion 2.

Further, a inner portion 4 is disposed within the middle portion 6 and is also made from a material similar to that of the outer portion 2. Inner portion 4 also functions to help block the heat generated from the UV light. Further, inner portion 4 has a periphery which is also attached in a gathered fashion to the periphery of middle portion 6 and to the periphery of outer portion 2.

In addition, a stretchable band 13, preferably of elastic, may be attached to the periphery of either the inner portion 4, the periphery of middle portion 6 or the periphery of outer portion 2. The stretchable band 13 allows the head covering 15 to snugly and comfortably fit around the head of a wearer.

Finally, it should be understood by those of skill in the art that other modifications and changes can be made without departing from the spirit and the scope of the invention and without diminishing its attendant advantages. For example, as described herein, outer portion 2, middle portion 6 and inner portion 4 may be made from materials of various sizes to fit heads of different sizes. Furthermore, the outer portion 2 and the inner portion 6 may be made from other materials which are aesthetically pleasing and yet accomplish the desired objectives of this invention.

Such changes, as well as other changes, are intended to be consistent with the invention described herein. It is therefore intended that such changes and modifications be covered by the following claims.

I claim:

1. An outer portion formed from fabric, the outer portion having a periphery, the outer portion having a first and a second surface;

a middle portion having a protective foil layer, the middle portion having a first side and a second side, the outer layer second side being adjacent the middle portion first side, and a periphery attached to the periphery of the outer portion in a gathered manner; and an inner portion formed from fabric having a periphery, the inner portion having a first side and a second side, the middle layer second side adjacent the inner portion first side, the inner portion periphery attached to the middle portion periphery and to the outer portion periphery in a gathered manner.

2. The hair covering of claim 1 further comprising a stretchable band portion attached to the periphery of either the inner portion, middle portion or outer portion for contacting the head of the wearer and providing a comfortable and secure fit around the head of the wearer.

3. The hair covering of claim 1 wherein the middle portion further comprises a first plastic film disposed between the protective foil layer of the middle portion and the inner portion to act as a barrier to any heat build Up that occurs because of heat generated inside of the hair covering due to the ultra violet lights and for protecting the protective foil layer of the middle portion from breakage or damage due to use and handling by a wearer.

4. The hair covering of claim 3 wherein the middle portion further comprises a second plastic film disposed between the protective layer of the middle portion and the outer portion to further act as a barrier to the heat build up that occurs because of the heat generated inside of the hair covering due to the ultra violet lights and for further protecting the protective foil layer of the middle portion from breakage or damage due to use and handling by a wearer.

5. The hair covering of claim 3 further comprising a stretchable band portion attached to the periphery of either the inner portion, middle portion or outer portion for contacting the head of the wearer and providing a comfortable and secure fit around the head of the wearer.

6. The hair covering of claim 4 further comprising a stretchable band portion attached to the periphery of the inner portion for contacting the head of the wearer and providing a comfortable and secure fit around the head of the wearer.

* * * * *